United States Patent
Gondek et al.

(10) Patent No.: US 10,602,020 B2
(45) Date of Patent: Mar. 24, 2020

(54) DYNAMIC THRESHOLD BASED ERROR DIFFUSION

(71) Applicant: Hewlett-Packard Development Company, L.P., Spring, TX (US)

(72) Inventors: Jay S Gondek, Vancouver, WA (US); Jason M Quintana, Vancouver, WA (US); Matthew A Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/337,087

(22) PCT Filed: Oct. 31, 2016

(86) PCT No.: PCT/US2016/059785
§ 371 (c)(1),
(2) Date: Mar. 27, 2019

(87) PCT Pub. No.: WO2018/080549
PCT Pub. Date: May 3, 2018

(65) Prior Publication Data
US 2020/0036861 A1    Jan. 30, 2020

(51) Int. Cl.
*H04N 1/405*    (2006.01)
*H04N 1/409*    (2006.01)
*B41J 2/205*    (2006.01)

(52) U.S. Cl.
CPC ......... *H04N 1/4053* (2013.01); *H04N 1/4092* (2013.01); *B41J 2/2056* (2013.01)

(58) Field of Classification Search
CPC .... H04N 1/4052; H04N 1/4053; H04N 1/409; H04N 1/4092; G03G 3/2059; G03G 3/2062; G03G 3/2066
See application file for complete search history.

(56) References Cited

U.S. PATENT DOCUMENTS

| | | | |
|---|---|---|---|
| 5,045,952 A | 9/1991 | Eschbach |
| 5,268,774 A | 12/1993 | Esehbech |
| 5,313,287 A | 5/1994 | Barton |
| 5,535,019 A | 7/1996 | Eschbach |
| 7,079,281 B1 | 7/2006 | Ng et al. |

(Continued)

FOREIGN PATENT DOCUMENTS

WO    WO 2016/060653 A1    4/2016

OTHER PUBLICATIONS

Li, X., Edge-directed Error Diffusion Halftoning, Nov. 2006, IEEE Signal Processing Letters v 13 No. 11 ~ 3 pages.

(Continued)

*Primary Examiner* — Scott A Rogers
(74) *Attorney, Agent, or Firm* — Mannava & Kang, P.C.

(57) ABSTRACT

In some examples, dynamic threshold based error diffusion may include determining whether a pixel associated with a pattern to be printed includes a lighter tone or a darker tone compared to an adjacent pixel. In response to a determination that the pixel associated with the pattern to be printed includes the lighter tone or the darker tone compared to the adjacent pixel, a firing threshold may be respectively increased or decreased to respectively decrease or increase a likelihood of printing of the pattern.

15 Claims, 11 Drawing Sheets

(56) References Cited

U.S. PATENT DOCUMENTS

| | | | |
|---|---|---|---|
| 7,203,376 B2* | 4/2007 | Takahashi | H04N 1/40087 358/3.03 |
| 8,681,378 B2* | 3/2014 | Kakutani | H04N 1/4092 358/1.9 |
| 8,705,128 B2* | 4/2014 | Kakutani | B41J 2/2132 358/1.9 |
| 8,760,725 B1 | 6/2014 | Keithley | |
| 2004/0179240 A1* | 9/2004 | Lee | H04N 1/4053 358/3.05 |
| 2004/0218220 A1* | 11/2004 | Thompson | H04N 1/4053 358/3.03 |
| 2009/0195836 A1 | 8/2009 | He | |
| 2011/0032574 A1 | 2/2011 | Kakutani | |

OTHER PUBLICATIONS

Speigle, J.M. et al., Enhanced Error Diffusion with Thresholds Modulated by Spatio-Chromatically Correlated Noise, 2000, http://www.sharp-world.com/ ~ 8 pages.

* cited by examiner

```
300 →  edgeThresh = 12
302 →  VinhibitDot = 320     # vertical edge
304 →  VencourageDot = 196
306 →  HinhibitDot = 300     # horizontal edge
308 →  HencourageDot = 216
310
312 →  if nextTone < (tone - edgeThresh) or lastTone < (tone - edgeThresh):
314 →      T1 = T1 * VencourageDot / 256
316 →  elif localim[x, y-1][0] < (tone - edgeThresh) or localim[x, y+1][0] < (tone - edgeThresh):
318 →      T1 = T1 * HencourageDot / 256
320 →  elif nextTone > (tone + edgeThresh) or lastTone > (tone + edgeThresh):
322 →      T1 = T1 * VinhibitDot / 256
324 →  elif localim[x, y-1][0] > (tone + edgeThresh) or localim[x, y+1][0] > (tone + edgeThresh):
        T1 = T1 * HinhibitDot / 256
```

FIG. 3 edgeThresh = 12
inhibitDot = 320
encourageDot = 196

500 → if nextTone < (tone - edgeThresh) or lastTone < (tone - edgeThresh):
       T1 = T1 * encourageDot / 256
502 → elif nextTone > (tone + edgeThresh) or lastTone > (tone + edgeThresh):
       T1 = T1 * inhibitDot / 256

FIG. 5

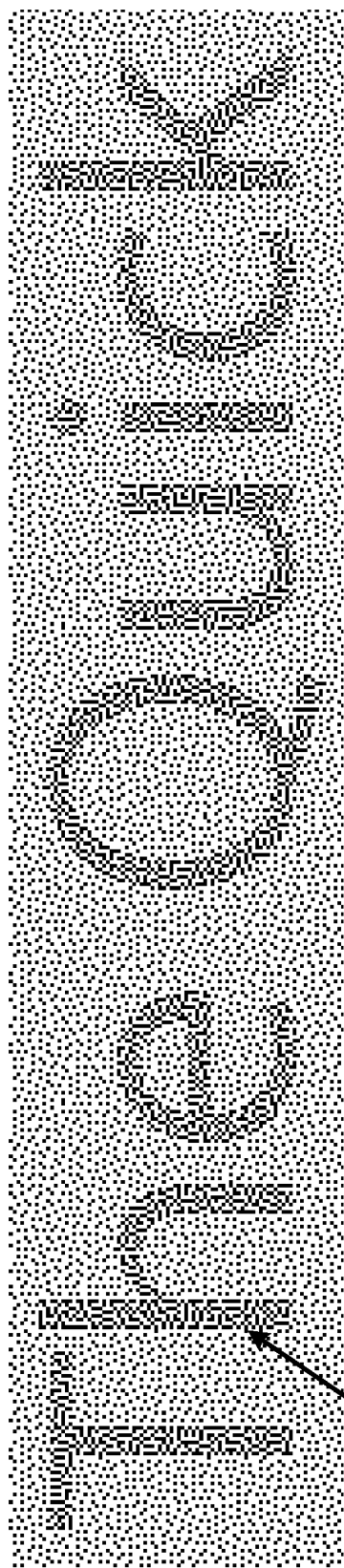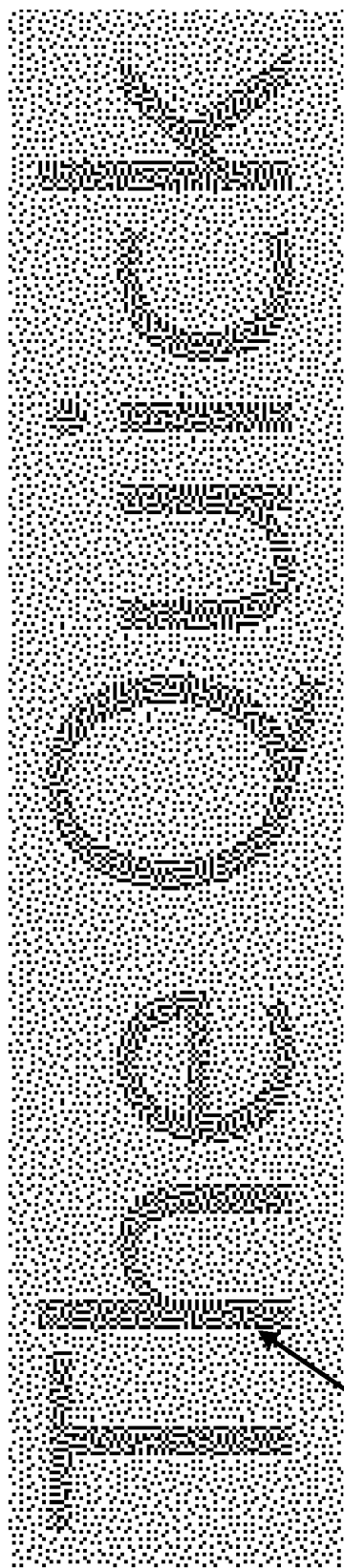

1000

DETERMINE WHETHER A PIXEL ASSOCIATED WITH A PATTERN TO BE PRINTED INCLUDES A LIGHTER TONE, A DARKER TONE, OR A SIMILAR TONE COMPARED TO AN ADJACENT PIXEL
1002

IN RESPONSE TO A DETERMINATION THAT THE PIXEL ASSOCIATED WITH THE PATTERN TO BE PRINTED INCLUDES THE SIMILAR TONE COMPARED TO THE ADJACENT PIXEL, UTILIZE A FIRING THRESHOLD TO DETERMINE WHETHER TO PRINT THE PATTERN BY DETERMINING WHETHER THE TONE OF THE PIXEL ASSOCIATED WITH THE PATTERN TO BE PRINTED IS GREATER THAN THE FIRING THRESHOLD, AND IN RESPONSE TO A DETERMINATION THAT THE TONE OF THE PIXEL ASSOCIATED WITH THE PATTERN TO BE PRINTED IS GREATER THAN THE FIRING THRESHOLD, GENERATE INSTRUCTIONS TO PRINT THE PATTERN
1004

IN RESPONSE TO A DETERMINATION THAT THE PIXEL ASSOCIATED WITH THE PATTERN TO BE PRINTED INCLUDES THE LIGHTER TONE OR THE DARKER TONE COMPARED TO THE ADJACENT PIXEL, RESPECTIVELY INCREASE OR DECREASE THE FIRING THRESHOLD TO RESPECTIVELY DECREASE OR INCREASE A LIKELIHOOD OF PRINTING OF THE PATTERN
1006

FIG. 10

DYNAMIC THRESHOLD BASED ERROR DIFFUSION

BACKGROUND

A printing device, such as a printer, multifunction printer, and/or other such devices may be described as a peripheral which is used to make a persistent human readable representation of graphics or text on physical media such as paper. For an ink based printing device, printing material (e.g., ink) may be ejected onto a physical medium to thereby print content onto the physical medium.

BRIEF DESCRIPTION OF DRAWINGS

Features of the present disclosure are illustrated by way of example and not limited in the following figure(s), in which like numerals indicate like elements, in which:

FIG. 3 illustrates details of analysis performed for vertical and horizontal edges for dynamic threshold based error diffusion, according to an example of the present disclosure;

FIG. 5 illustrates details of analysis performed for one-dimensional dynamic threshold based error diffusion, according to an example of the present disclosure;

FIG. 8A illustrates edges of text generated based on application of the one-dimensional dynamic threshold based error diffusion of FIG. 5, and FIG. 8B illustrates edges of text generated based on application of the multi-pixel one-dimensional run dynamic threshold based error diffusion of FIG. 6, according to an example of the present disclosure;

FIG. 10 illustrates a flowchart of a method for dynamic threshold based error diffusion, according to an example of the present disclosure.

DETAILED DESCRIPTION

Figure 1:
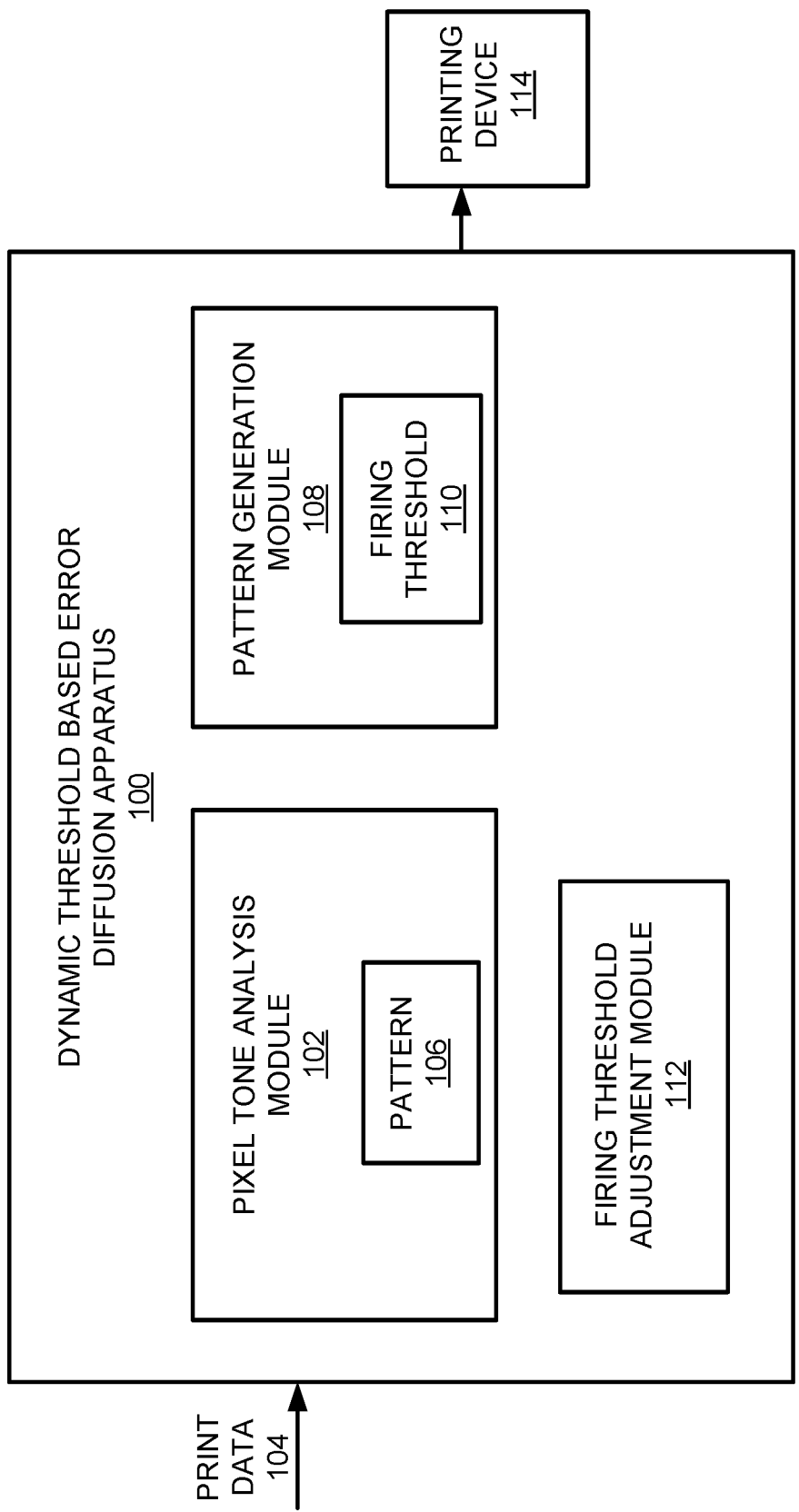
FIG. 1 illustrates a layout of a dynamic threshold based error diffusion apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A dynamic threshold based error diffusion apparatus, a method for dynamic threshold based error diffusion, and a non-transitory computer readable medium having stored thereon machine readable instructions to provide dynamic threshold based error diffusion are disclosed herein. The apparatus, method, and non-transitory computer readable medium disclosed herein provide for error diffusion to minimize edge blur by influencing where a pattern (e.g., a dot, a set of dots, or another shape) is placed.

With respect to error diffusion, error diffusion may be implemented to produce an ideal pattern distribution for a uniform tone. For example, a tone of a pixel may be compared to a threshold value, and a pattern may be produced on physical media if the tone of the pixel is greater than the threshold value. However, edges of graphics such as text and any other image content may be blurred.

In order to address the aforementioned technical challenges with respect to error diffusion, the apparatus, method, and non-transitory computer readable medium disclosed herein provide for error diffusion to minimize edge blur by comparing a pixel to a threshold value, producing a pattern if the pixel is greater than the threshold value, and then passing tone error associated with the decision to produce the pattern to adjacent pixels. The threshold value may be modified to increase a likelihood of producing the pattern (e.g., by ejecting a dot) in the case where the pixel being processed is a dark pixel that is adjacent to a light pixel. Similarly, the threshold value may be modified to decrease the likelihood of producing the pattern (e.g., by not ejecting the dot) in the case where the pixel being processed is a light pixel that is adjacent to a dark pixel.

For the apparatus, method, and non-transitory computer readable medium disclosed herein, printing material used to produce the pattern may comprise consumable fluids as well as other consumable materials. Printing material may comprise ink, toner, fluids, powders, colorants, varnishes, finishes, gloss enhancers, binders, and/or other such materials that may be utilized in a printing process.

For the apparatus, method, and non-transitory computer readable medium disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of a dynamic threshold based error diffusion apparatus (hereinafter also referred to as "apparatus 100"), according to an example of the present disclosure. In some examples, the apparatus 100 may include or be provided as a component of a print server for processing print data before the processed print data is transmitted to a printing apparatus, such as an inkjet printer, or any type of printing device. For example, the apparatus 100 may perform print job processing before the print job is sent to a printing apparatus. Alternatively, the apparatus 100 may be a component of a printing device.

Referring to FIG. 1, the apparatus 100 may include a pixel tone analysis module 102 to determine, for print data 104 associated with a print job, whether a pixel associated with a pattern 106 to be printed includes a lighter tone, a darker tone, or a similar tone compared to an adjacent pixel. The similar tone may represent a tone of the pixel associated with the pattern 106 to be printed that is within a specified range of a tone of the adjacent pixel. For example, if the pixel associated with the pattern 106 to be printed does not include the lighter tone or the darker tone, then the pixel associated with the pattern 106 to be printed may be determined to include the similar tone compared to an adjacent pixel. According to an example, the pattern 106 may include a dot associated with the pixel.

The apparatus 100 may further include a pattern generation module 108. With respect to the pattern generation module 108, in response to a determination that the pixel associated with the pattern 106 to be printed includes the similar tone compared to the adjacent pixel, the pattern generation module 108 may utilize a firing threshold 110 to determine whether to print the pattern 106. For example, the pattern generation module 108 may utilize the firing threshold 110 to determine whether to print the pattern 106 by determining whether the tone of the pixel associated with the pattern 106 to be printed is greater than the firing threshold 110, and in response to a determination that the tone of the pixel associated with the pattern 106 to be printed is greater than the firing threshold, generating instructions to print the pattern 106. Similarly, in response to a determination that the pixel associated with the pattern 106 to be printed includes the lighter tone or the darker tone compared to the adjacent pixel, the pattern generation module 108 may utilize a modified version of the firing threshold 110 to determine whether to print the pattern 106.

The apparatus 100 may further include a firing threshold adjustment module 112. With respect to the firing threshold adjustment module 112, in response to a determination that the pixel associated with the pattern 106 to be printed includes the lighter tone or the darker tone compared to the adjacent pixel, the firing threshold adjustment module 112 may respectively increase or decrease the firing threshold 110 (i.e., to generate a modified version of the firing threshold 110) to respectively decrease or increase a likelihood of printing of the pattern 106.

According to an example, the apparatus 100 may include or be provided as a component of a print server for processing print data before the processed print data is transmitted to a printing apparatus, such as an inkjet printer, or any type of printing device (e.g., a printing device 114).

As will be appreciated, some examples of the apparatus 100 may be configured with more or less modules, where modules may be configured to perform more or less operations. Furthermore, in some examples, the modules may be implemented by execution of instructions with a processing resource to cause the processing resource to perform the corresponding operations.

Figure 2:
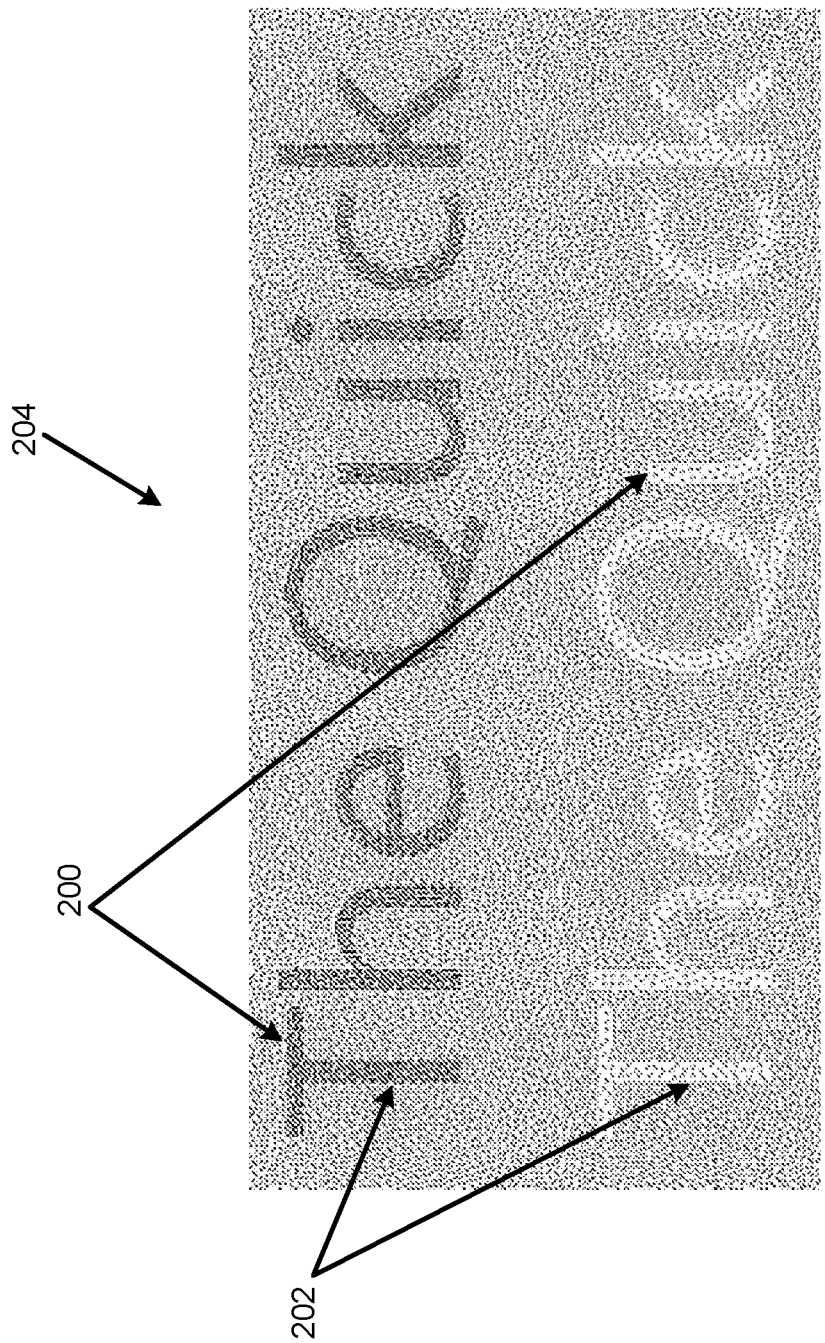
FIG. 2 illustrates edges of text generated based on application of dynamic threshold based error diffusion, according to an example of the present disclosure.

Referring next to FIG. 2, FIG. 2 illustrates edges of text generated based on application of dynamic threshold based error diffusion, according to an example of the present disclosure. With respect to FIG. 2, the apparatus 100 thus provides for error diffusion to minimize edge blur as shown at the horizontal and vertical edges 200, and 202, respectively, of the text 204.

Referring again to FIG. 1, operation of the apparatus 100 is described in further detail.

The pixel tone analysis module 102 may determine, for the print data 104, whether a pixel associated with the pattern 106 to be printed includes a lighter tone, a darker tone, or a similar tone compared to an adjacent pixel.

According to an example, as disclosed in further detail with respect to FIG. 3, the pixel tone analysis module 102 may determine whether the pixel associated with the pattern 106 to be printed includes the lighter tone compared to the adjacent pixel by determining whether the tone of the adjacent pixel on one side (e.g., left or above, or right or below pixel) of the pixel associated with the pattern 106 to be printed is greater than a value determined by the tone of the pixel associated with the pattern 106 to be printed plus an edge threshold (e.g., clauses 318 or 322 of FIG. 3), or a tone of another adjacent pixel on another side (e.g., right or below, or left or above pixel) of the pixel associated with the pattern 106 to be printed is greater than the value determined by the tone of the pixel associated with the pattern 106 to be printed plus the edge threshold (e.g., clauses 318 or 322 of FIG. 3). Further, in response to a determination that the tone of the adjacent pixel on the one side of the pixel associated with the pattern 106 to be printed is greater than the value determined by the tone of the pixel associated with the pattern 106 to be printed plus the edge threshold, or in response to a determination that the tone of the other adjacent pixel on the other side of the pixel associated with the pattern 106 to be printed is greater than the value determined by the tone of the pixel associated with the pattern 106 to be printed plus the edge threshold, the firing threshold adjustment module 112 may increase the firing threshold 110 to decrease the likelihood of printing of the pattern 106.

According to an example, as disclosed in further detail with respect to FIG. 3, the pixel tone analysis module 102 may determine whether the pixel associated with the pattern 106 to be printed includes the darker tone compared to the adjacent pixel by determining whether the tone of the adjacent pixel on one side (e.g., left or above, or right or below pixel) of the pixel associated with the pattern 106 to be printed is less than a value determined by the tone of the pixel associated with the pattern 106 to be printed minus an edge threshold (e.g., clauses 310 or 314 of FIG. 3), or a tone of another adjacent pixel on another side (e.g., right or below, or left or above pixel) of the pixel associated with the pattern 106 to be printed is less than the value determined by the tone of the pixel associated with the pattern 106 to be printed minus the edge threshold (e.g., clauses 310 or 314 of FIG. 3). Further, in response to a determination that the tone of the adjacent pixel on the one side of the pixel associated with the pattern 106 to be printed is less than the value determined by the tone of the pixel associated with the pattern 106 to be printed minus the edge threshold, or in response to a determination that the tone of the other adjacent pixel on the other side of the pixel associated with the pattern 106 to be printed is less than the value determined by the tone of the pixel associated with the pattern 106 to be printed minus the edge threshold, the firing threshold adjustment module 112 may decrease the firing threshold 110 to increase the likelihood of printing of the pattern 106.

According to an example, the pixel tone analysis module 102 may determine whether the pixel associated with the pattern 106 to be printed includes the lighter tone, the darker tone, or the similar tone compared to the adjacent pixel by analyzing a row of an image including a plurality of pixels including the pixel associated with the pattern 106 to be printed by determining whether the tone of the adjacent pixel on one side (e.g., left or above, or right or below pixel) of the pixel associated with the pattern 106 to be printed is greater than a value determined by the tone of the pixel associated with the pattern 106 to be printed plus an edge threshold (e.g., clauses 318 or 322 of FIG. 3), a tone of another adjacent pixel on another side (e.g., right or below, or left or above pixel) of the pixel associated with the pattern 106 to be printed is greater than the value determined by the tone of the pixel associated with the pattern 106 to be printed plus the edge threshold (e.g., clauses 318 or 322 of FIG. 3), the tone of the adjacent pixel on the one side (e.g., left or above, or right or below pixel) of the pixel associated with the pattern 106 to be printed is less than a value determined by the tone of the pixel associated with the pattern 106 to be printed minus the edge threshold (e.g., clauses 310 or 314 of FIG. 3), or the tone of the other adjacent pixel on the other side (e.g., right or below, or left or above pixel) of the pixel associated with the pattern 106 to be printed is less than the value determined by the tone of the pixel associated with the pattern 106 to be printed minus the edge threshold (e.g., clauses 310 or 314 of FIG. 3). Further, in response to a determination that the tone of the adjacent pixel on the one side of the pixel associated with the pattern 106 to be printed is greater than the value determined by the tone of the pixel associated with the pattern 106 to be printed plus the edge threshold, or in response to a determination that the tone of the other adjacent pixel on the other side of the pixel associated with the pattern 106 to be printed is greater than the value determined by the tone of the pixel associated with the pattern 106 to be printed plus the edge threshold, the firing threshold adjustment module 112 may increase the firing threshold 110 to decrease the likelihood of printing of the pattern 106. Alternatively or additionally, in response to a determination that the tone of the adjacent pixel on the one side of the pixel associated with the pattern 106 to be printed is less than the value determined by the tone of the pixel associated with the pattern 106 to be printed minus the edge threshold, or in response to a determination that the tone of the other adjacent pixel on the other side of the pixel associated with the pattern 106 to be printed is less than the value determined by the tone of the pixel associated with the pattern 106 to be printed minus the edge threshold, the firing threshold adjustment module 112 may decrease the firing threshold 110 to increase the likelihood of printing of the pattern 106. Further, as disclosed herein with respect to FIG. 7, rows of the image may be analyzed by reversing, for each further row, an order of the adjacent pixel on the one side of the pixel associated with the pattern 106 to be printed and the other adjacent pixel on the other side of the pixel associated with the pattern 106 to be printed.

According to an example, the adjacent pixel on the one side of the pixel associated with the pattern 106 to be printed may represent a pixel to a left side or above the pixel associated with the pattern 106 to be printed, and the other adjacent pixel on the other side of the pixel associated with the pattern 106 to be printed respectively may represent a pixel to a right side or below the pixel associated with the pattern 106 to be printed.

FIG. 3 illustrates details of analysis performed for vertical and horizontal edges for dynamic threshold based error diffusion, according to an example of the present disclosure.

Referring to FIG. 3, the "edgeTresh" may represent an edge threshold parameter 300 that is used to determine when an edge is encountered for an image corresponding to the print data 104. For the example of FIG. 3, the edge threshold parameter 300 may be specified to include a value of 12. However, the edge threshold parameter 300 may be specified to include other values, based, for example, on the tone of the pixel associated with the pattern 106 to be printed, the type of image associated with the print data 104, learning based on previously specified edge thresholds and associated image content, etc. Thus, according to an example, the edge threshold parameter 300 may be adjusted based on the tone of the pixel associated with the pattern 106 to be printed.

The "VinhibitDot" may represent a vertical edge decrease parameter 302 used to decrease a likelihood of printing of the pattern 106 for a vertical edge. For the example of FIG. 3, the vertical edge decrease parameter 302 may be specified to include a value of 320.

The "VencourageDot" may represent a vertical edge increase parameter 304 used to increase a likelihood of printing of the pattern 106 for a vertical edge. For the example of FIG. 3, the vertical edge increase parameter 304 may be specified to include a value of 196.

The "HinhibitDot" may represent a horizontal edge decrease parameter 306 used to decrease a likelihood of printing of the pattern 106 for a horizontal edge. For the example of FIG. 3, the horizontal edge decrease parameter 306 may be specified to include a value of 300.

The "HencourageDot" may represent a horizontal edge increase parameter 308 used to increase a likelihood of printing of the pattern 106 for a horizontal edge. For the example of FIG. 3, the horizontal edge increase parameter 308 may be specified to include a value of 216.

According to an example, the vertical edge decrease parameter 302, the vertical edge increase parameter 304, the horizontal edge decrease parameter 306, and/or the horizontal edge increase parameter 308 may be specified to increase or decrease the firing threshold 110 by a percentage that corresponds to a difference between a tone of the pixel associated with the pattern 106 to be printed and a tone of an adjacent pixel (e.g., a left or above pixel), and/or a difference between the tone of the pixel associated with the pattern 106 to be printed and a tone of another adjacent pixel (e.g., a right or below pixel) to respectively decrease or increase the likelihood of printing of the pattern 106.

According to an example, the vertical edge decrease parameter 302, the vertical edge increase parameter 304, the horizontal edge decrease parameter 306, and/or the horizontal edge increase parameter 308 may be specified to increase or decrease the firing threshold 110 by a percentage that corresponds to a tone of the pixel associated with the pattern 106 to be printed to respectively decrease or increase the likelihood of printing of the pattern 106.

Figure 4:
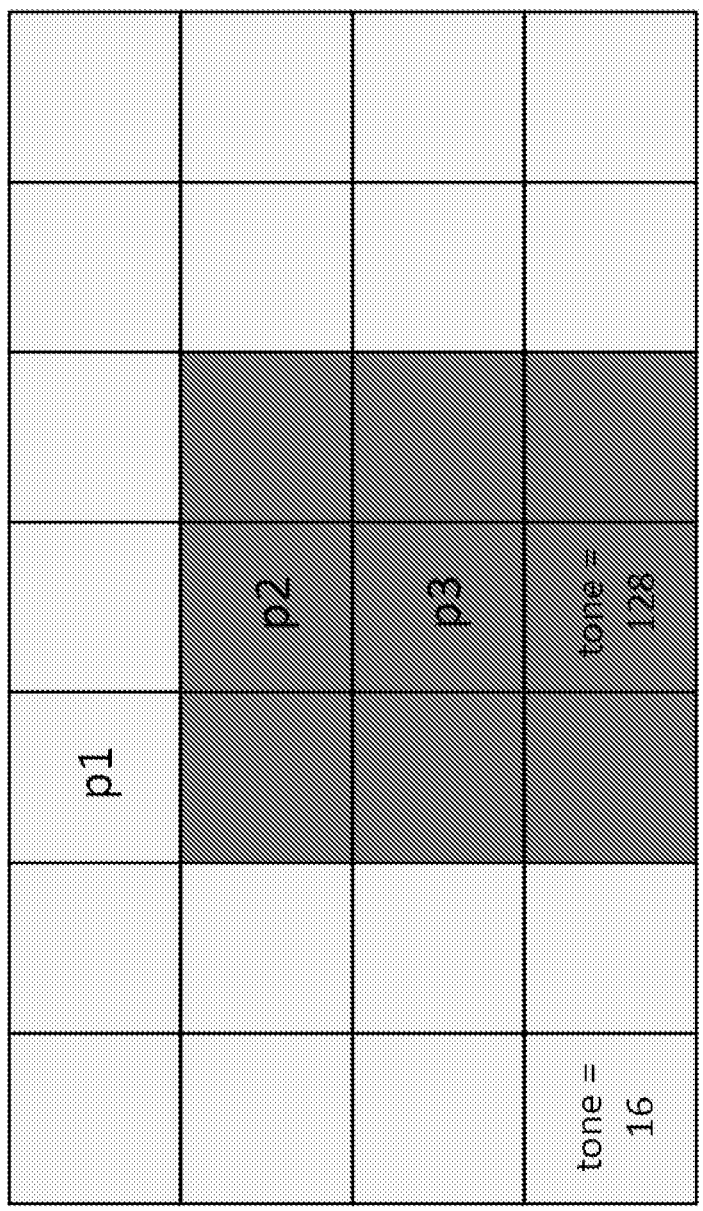
FIG. 4 illustrates operation of the dynamic threshold based error diffusion apparatus of FIG. 1 for dynamic threshold based error diffusion, according to an example of the present disclosure.

FIG. 4 illustrates operation of the apparatus 100 for dynamic threshold based error diffusion, according to an example of the present disclosure.

Referring to FIGS. 3 and 4, assuming that pixel p1 is the pixel associated with the pattern 106 (e.g., the current pixel being processed), where the current tone is 16 for pixel p1, and the tone below pixel p1 is 128, for clause 310 (i.e., if nextTone<(tone−edgeThresh) or lastTone<(tone−edgeThresh)), nextTone and lastTone refer to the pixels to the left and right of p1, respectively. Alternatively, nextTone and lastTone may refer to the pixels to the right and left of p1, respectively, depending on the direction of the analysis. The clause 310 may be analyzed by the pixel tone analysis module 102 to determine whether the current pixel is darker by some threshold (i.e., edgeThresh) than the pixels to the left or right. In this example, since the difference between the current tone (tone) and the tones to the left and right is 0, clause 310 is determined to be False.

For the example of FIGS. 3 and 4, since the clause 310 is determined to be False, the pixel tone analysis module 102 may analyze clause 314 (i.e., elif localim[x, y−1][0]<(tone−edgeThresh) or localim[x, y+1][0]<(tone−edgeThresh)). The clause 314 may be analyzed by the pixel tone analysis module 102 to determine whether the current pixel is darker by some threshold (i.e., edgeThresh) than the pixels that are above or below. With respect to clause 314, localim[x, y−1][0] refers to the pixel above the current pixel, and localim[x, y+1][0] refers to the pixel below the current pixel. Since the current pixel tone is 16, and the tone of the pixel below is 128, clause 314 is determined to be False.

For the example of FIGS. 3 and 4, since the clauses 310 and 314 are determined to be False, the pixel tone analysis module 102 may analyze clause 318 (i.e., elif nextTone>(tone+edgeThresh) or lastTone>(tone+edgeThresh)). With respect to clause 318, the pixel tone analysis module 102 may compare the tone of the current pixel against the left and right pixels to determine whether the current pixel is lighter by some threshold (i.e., edgeThresh) than the left or right pixels. In this example, since the difference between the current tone (tone) and the tones of the pixels to the left and right is 0, clause 318 is determined to be False.

For the example of FIGS. 3 and 4, since the clauses 310, 314, and 318 are determined to be False, the pixel tone analysis module 102 may analyze clause 322 (i.e., elif localim[x, y−1][0]>(tone+edgeThresh) or localim[x, y+1][0]>(tone+edgeThresh)) to determine if the current pixel is lighter than the pixels above or below. In this case, since the current pixel p1 is lighter than the pixel below ((i.e., localim[x, y+1][0]>(tone+edgeThresh)), which equates to 128>(16+12)), from the threshold modification clauses 312, 316, 320, and 324, clause 324 (i.e., T1=T1*HinhibitDot/ 256) may be implemented to increase the firing threshold 110 (T1), which in turn decreases the likelihood of the pattern 106 being placed in that position. With respect to the clause 324, the increase in the firing threshold 110 may represent an approximately 25% (or another specified) increase. The value of 256 may be associated with use of 8-bit color graphics to store image information in a computer's memory or in an image file.

For the example of FIGS. 3 and 4, considering pixel p2, the pixel tone analysis module 102 may determine the clause 314 to be True. In this regard, the firing threshold 110 may be reduced, to thus increase a likelihood of the pattern 106 being printed because the current pixel is darker than the pixel above (e.g., localim[x, y−1][0]).

For the example of FIGS. 3 and 4, considering pixel p3, the pixel tone analysis module 102 may determine that none of the clauses (310, 314, 318, and 322) evaluate to True, and thus the firing threshold adjustment module 112 does not modify the firing threshold 110. In this case, since the pixel p3 associated with the pattern 106 to be printed does not include the lighter tone or the darker tone, then the pixel p3 associated with the pattern 106 to be printed may be determined to include the similar tone compared to each of the adjacent pixels.

With respect to the clauses 310, 314, 318, or 322, these clauses may also be modified to evaluate the pixels associated with the print data 104 to implement various other formats for analysis of the pixels. For example, adjacent pixels may be evaluated in diagonal (as opposed to left/right, and/or above/below) manner, adjacent pixels may be evaluated in groups, adjacent pixels may be evaluated in an alternating manner where certain pixels may be bypassed, etc.

FIG. 5 illustrates details of analysis performed for one-dimensional dynamic threshold based error diffusion, according to an example of the present disclosure.

Compared to the two-dimensional approach of FIG. 3, the one-dimensional dynamic threshold based error diffusion approach of FIG. 5 implements the decision to modify the firing threshold 110 by considering neighboring pixels that are just prior, and just after the current pixel in the processed raster. The one-dimensional dynamic threshold based error diffusion approach of FIG. 5 implements error diffusion with respect to vertical and diagonal edges, without the need to buffer and compute against raster pixels associated with horizontal edges (i.e., above and below pixels). Accordingly, for images that primarily include vertical and/or diagonal edges, the one-dimensional dynamic threshold based error diffusion approach of FIG. 5 may be implemented.

For the one-dimensional dynamic threshold based error diffusion approach of FIG. 5, the clauses 500 and 502 analyzed by the pixel tone analysis module 102 respectively correspond to the clauses 310 and 318 of FIG. 3.

Figure 6:
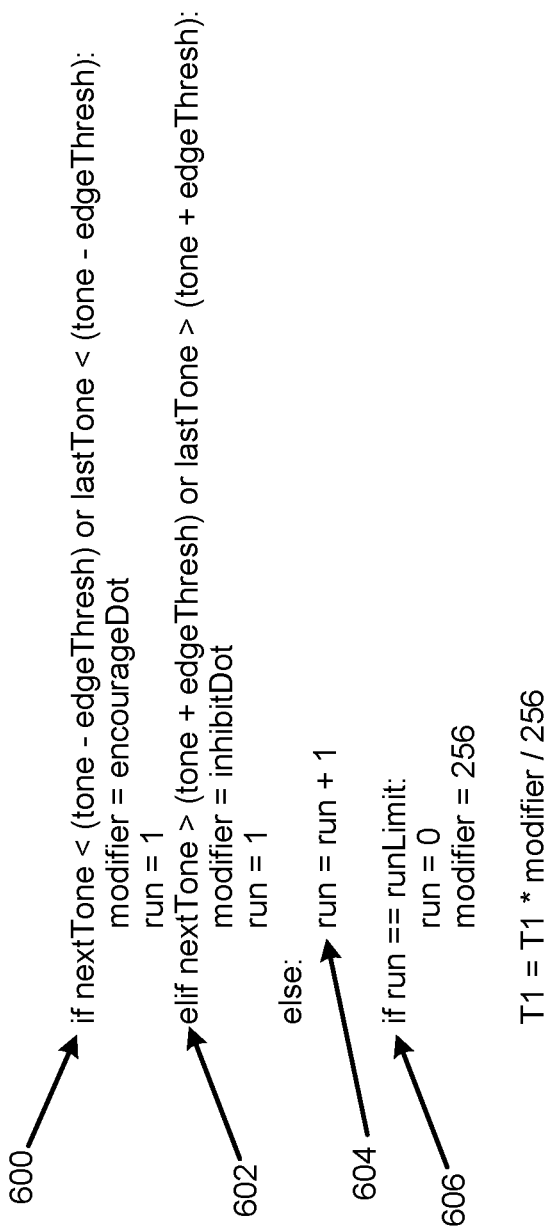
FIG. 6 illustrates details of analysis performed for multi-pixel one-dimensional run dynamic threshold based error diffusion, according to an example of the present disclosure.

FIG. 6 illustrates details of analysis performed for multi-pixel one-dimensional run dynamic threshold based error diffusion, according to an example of the present disclosure. For the multi-pixel one-dimensional run dynamic threshold based error diffusion approach of FIG. 6, the clauses 600 and 602 analyzed by the pixel tone analysis module 102 correspond to the clauses 310 and 318 of FIG. 3.

Referring to FIG. 6, in order to achieve higher edge differentiation, the pixel tone analysis module 102 may implement a modified firing threshold 110 for a run of pixels (i.e., based on a run counter 604 and run limit 606 as disclosed herein).

Figure 7:
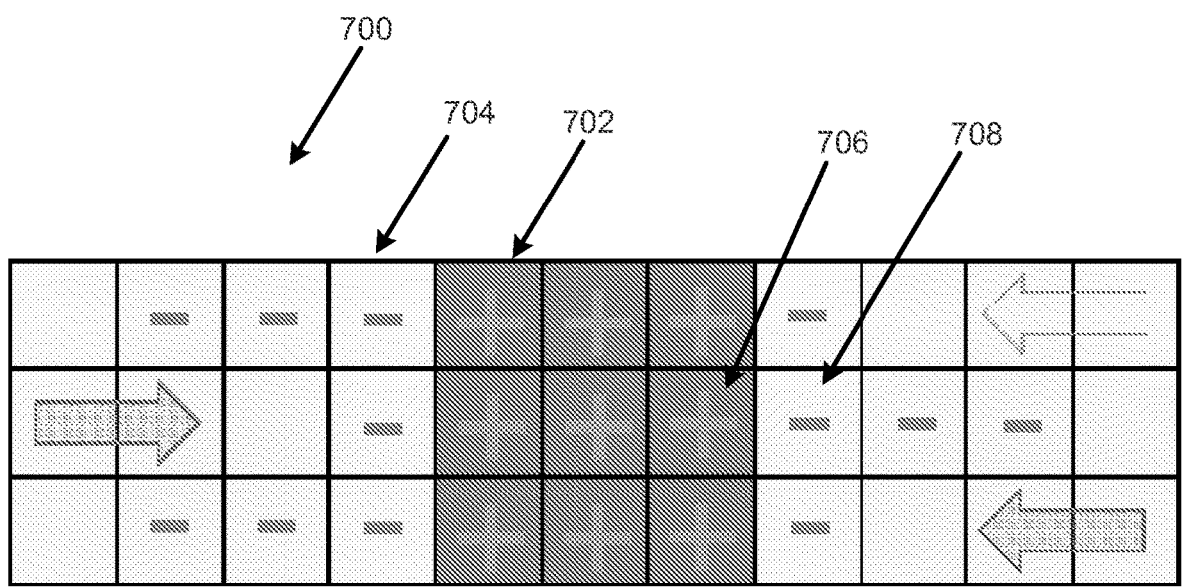
FIG. 7 illustrates operation of the dynamic threshold based error diffusion apparatus of FIG. 1 for multi-pixel one-dimensional run dynamic threshold based error diffusion, according to an example of the present disclosure.

According to an example, as disclosed herein with respect to FIGS. 6 and 7, the pattern generation module 108 may determine, for the pixel associated with the pattern 106 to be printed, whether the firing threshold 110 is increased or whether the firing threshold 110 is decreased. In response to a determination, for the pixel associated with the pattern 106 to be printed, that the firing threshold 110 is increased or that the firing threshold 110 is decreased, the pattern generation module 108 may determine, for a next pixel associated with the pattern 106 to be printed, a change in the firing threshold 110 based on a determination of whether the firing threshold 110 is decreased or whether the firing threshold 110 is increased. Further, the pattern generation module 108 may determine a run limit 606 associated with the firing threshold 110. In response to a determination of the change in the firing threshold 110, the pattern generation module 108 may maintain the firing threshold 110 for the run limit 606 for a number of pixels corresponding to the run limit 606.

Referring to FIG. 6, with respect to modification of the firing threshold 110 for a run of pixels, after passing from a dark pixel to a light pixel, the firing threshold adjustment module 112 may raise the firing threshold to inhibit printing of the pattern 106 for a further extent. For unidirectional error diffusion, this approach may result in directional artifacts. However, since the pixel tone analysis module 102 implements serpentine error diffusion traversal (i.e., traversing from left to right, and then alternating from right to left, etc., for each further row of pixels), the effect of implementation of the multi-pixel one-dimensional run dynamic threshold based error diffusion is uniform in both directions.

FIG. 7 illustrates operation of the dynamic threshold based error diffusion apparatus of FIG. 1 for multi-pixel one-dimensional run dynamic threshold based error diffusion, according to an example of the present disclosure.

In FIG. 7, the arrows indicate direction of processing of the pixels. The image of FIG. 7 illustrates error diffusion in a serpentine manner where, for example, odd rows are processed right to left, and even rows are processed left to right (or vice-versa). For the example of FIGS. 6 and 7, the pixel tone analysis module 102 may evaluate pixels (in a forward and backward manner one pixel at a time for efficiency (as opposed to evaluating multiple pixels in each direction)). When a decision is made to increase or decrease the likelihood of the printing of the pattern 106, that decision stands until either a significant change in tone occurs, or a distance specified by the run limit 606 has been processed. For example, assuming that the run limit 606 is specified as 3, the "−" symbols denote decreasing of the likelihood of the printing of the pattern 106, and the "+" symbols denote increasing of the likelihood of the printing of the pattern 106. As shown in FIG. 7, for the first row of pixels, the decreasing of the likelihood of the printing of the pattern 106 continues for three pixels (per the run limit 606) after change to the firing threshold from pixel 702 to pixel 704. Similarly, for the second row of pixels, the decreasing of the likelihood of the printing of the pattern 106 continues for three pixels (per the run limit 606) after change to the firing threshold from pixel 706 to pixel 708.

FIG. 8A illustrates edges of text generated based on application of the one-dimensional dynamic threshold based error diffusion of FIG. 5, according to an example of the present disclosure. FIG. 8B illustrates edges of text generated based on application of the multi-pixel one-dimensional run dynamic threshold based error diffusion of FIG. 6, according to an example of the present disclosure.

With respect to FIGS. 8A and 8B, the edges 800 and 802 represent edges generated based on one-dimensional dynamic threshold based error diffusion, and multi-pixel one-dimensional run dynamic threshold based error diffusion. The edge 802 includes a greater "white" boundary adjacent the edge of the letter "h" based on the application of the run limit 606, where the run limit 606 provides for continuation of a decrease of the likelihood of the printing of the pattern 106 (e.g., for three pixels, per the run limit 3 of FIG. 7) after change to the firing threshold (e.g., as shown in FIG. 7 for pixel 702 and pixel 704).

Figure 9:
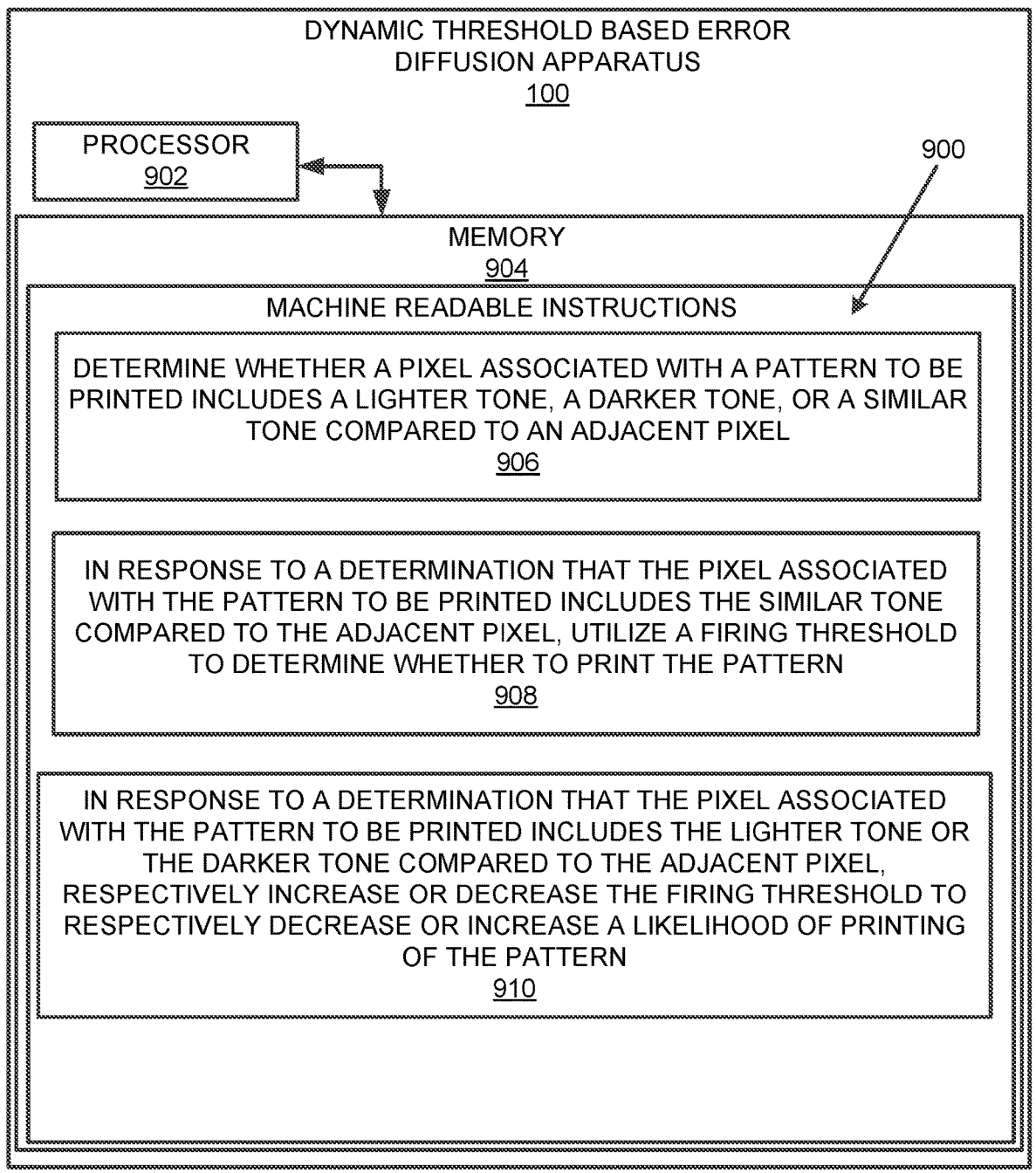
FIG. 9 illustrates a block diagram for dynamic threshold based error diffusion, according to an example of the present disclosure.
Figure 11:
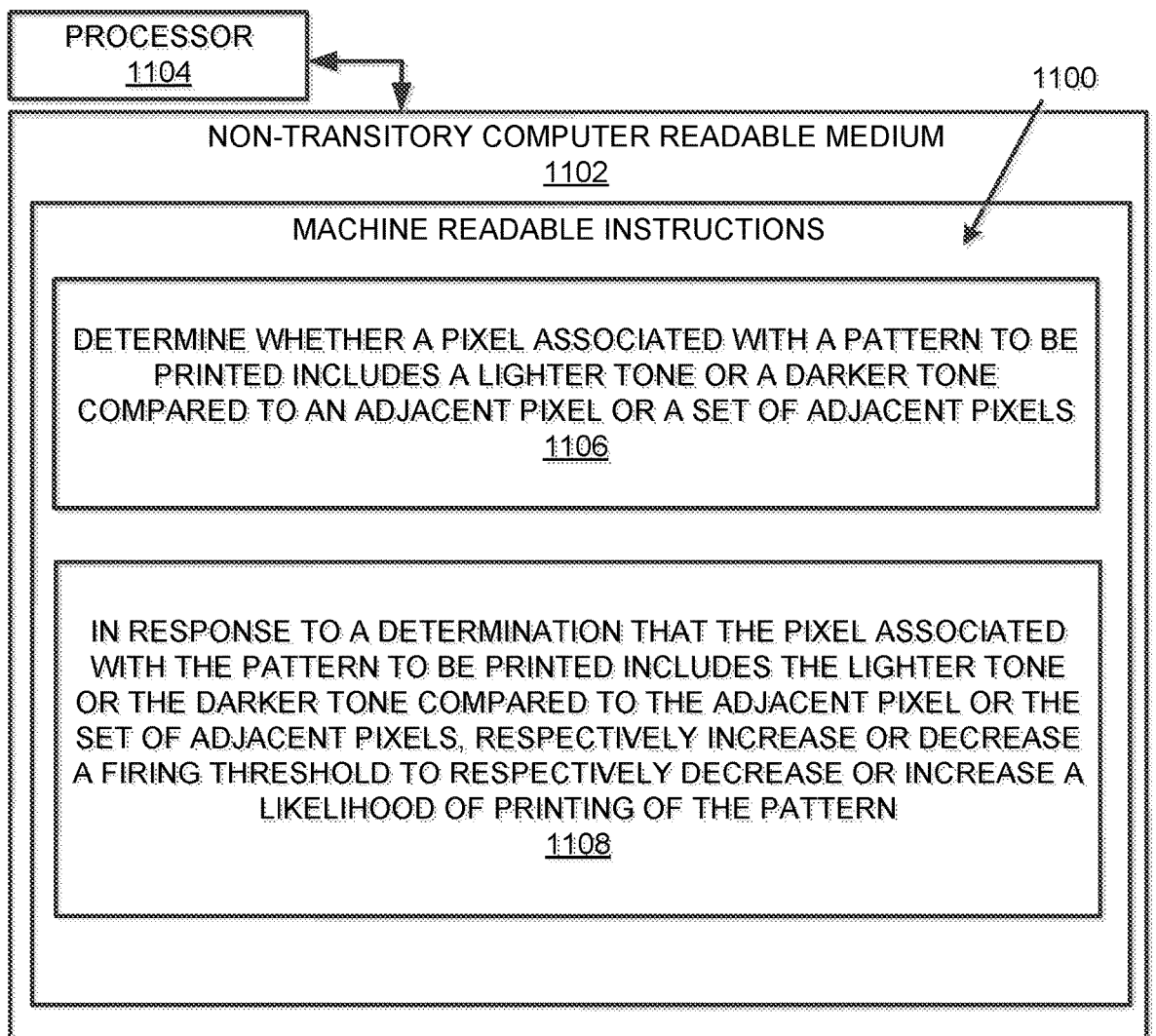
FIG. 11 illustrates a further block diagram for dynamic threshold based error diffusion, according to an example of the present disclosure.

FIGS. 9-11 respectively illustrate a block diagram 900, a flowchart of a method 1000, and a further block diagram 1100 for dynamic threshold based error diffusion, according to examples. The block diagram 900, the method 1000, and the block diagram 1100 may be implemented on the apparatus 100 described above with reference to FIG. 1 by way of example and not limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent a method for dynamic threshold based error diffusion, and the steps of the method. FIG. 11 may represent a non-transitory computer readable medium 1102 having stored thereon machine readable instructions to provide dynamic threshold based error diffusion. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, at block 906, the memory 904 may include instructions to determine (e.g., by the pixel tone analysis module 102) whether a pixel associated with the pattern 106 to be printed includes a lighter tone, a darker tone, or a similar tone compared to an adjacent pixel. The similar tone may represent a tone of the pixel associated with the pattern 106 to be printed that is within a specified range of a tone of the adjacent pixel.

In response to a determination that the pixel associated with the pattern 106 to be printed includes the similar tone compared to the adjacent pixel, at block 908, the memory 904 may include instructions to utilize (e.g., by the pattern generation module 108) the firing threshold 110 to determine whether to print the pattern 106.

In response to a determination that the pixel associated with the pattern 106 to be printed includes the lighter tone or the darker tone compared to the adjacent pixel, at block 910, the memory 904 may include instructions to respectively increase or decrease (e.g., by the firing threshold adjustment module 112) the firing threshold 110 to respectively decrease or increase a likelihood of printing of the pattern 106.

Referring to FIGS. 1-8B, and 10, and particularly FIG. 10, for the method 1000, at block 1002, the method may include determining (e.g., by the pixel tone analysis module 102) whether a pixel associated with the pattern 106 to be printed includes a lighter tone, a darker tone, or a similar tone compared to an adjacent pixel. The similar tone may represent a tone of the pixel associated with the pattern 106 to be printed that is within a specified range of a tone of the adjacent pixel.

In response to a determination that the pixel associated with the pattern 106 to be printed includes the similar tone compared to the adjacent pixel, at block 1004, the method may include utilizing (e.g., by the pattern generation module 108) the firing threshold 110 to determine whether to print the pattern 106 by determining whether the tone of the pixel associated with the pattern 106 to be printed is greater than the firing threshold 110, and in response to a determination that the tone of the pixel associated with the pattern 106 to be printed is greater than the firing threshold 110, generating instructions to print the pattern 106.

In response to a determination that the pixel associated with the pattern 106 to be printed includes the lighter tone or the darker tone compared to the adjacent pixel, at block 1006, the method may include respectively increasing or decreasing (e.g., by the firing threshold adjustment module 112) the firing threshold 110 to respectively decrease or increase a likelihood of printing of the pattern 106.

Referring to FIGS. 1-8B, and 11, and particularly FIG. 11, for the block diagram 1100, at block 1106, the non-transitory computer readable medium 1102 may include instructions to determine (e.g., by the pixel tone analysis module 102) whether a pixel associated with a pattern 106 to be printed includes a lighter tone or a darker tone compared to an adjacent pixel or a set of adjacent pixels.

In response to a determination that the pixel associated with the pattern 106 to be printed includes the lighter tone or the darker tone compared to the adjacent pixel or the set of adjacent pixels, at block 1108, the non-transitory computer readable medium 1102 may include instructions to respectively increase or decrease (e.g., by the firing threshold adjustment module 112) a firing threshold 110 to respectively decrease or increase a likelihood of printing of the pattern 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A dynamic threshold based error diffusion apparatus comprising:
    a processor; and
    a memory storing machine readable instructions that when executed by the processor cause the processor to:
        determine whether a pixel associated with a pattern to be printed includes a lighter tone, a darker tone, or a similar tone compared to an adjacent pixel, wherein the similar tone represents a tone of the pixel associated with the pattern to be printed that is within a specified range of a tone of the adjacent pixel;
        in response to a determination that the pixel associated with the pattern to be printed includes the similar tone compared to the adjacent pixel, utilize a firing threshold to determine whether to print the pattern; and
        in response to a determination that the pixel associated with the pattern to be printed includes the lighter tone or the darker tone compared to the adjacent pixel, respectively increase or decrease the firing threshold to respectively decrease or increase a likelihood of printing of the pattern.

2. The apparatus according to claim 1, wherein the pattern includes a dot associated with the pixel.

3. The apparatus according to claim 1, wherein the machine readable instructions to utilize the firing threshold to determine whether to print the pattern when executed by the processor further cause the processor to:
    determine whether the tone of the pixel associated with the pattern to be printed is greater than the firing threshold; and
    in response to a determination that the tone of the pixel associated with the pattern to be printed is greater than the firing threshold, generate instructions to print the pattern.

4. The apparatus according to claim 1, wherein the machine readable instructions to determine whether the pixel associated with the pattern to be printed includes the lighter tone compared to the adjacent pixel when executed by the processor further cause the processor to:
    determine whether
        the tone of the adjacent pixel on one side of the pixel associated with the pattern to be printed is greater than a value determined by the tone of the pixel associated with the pattern to be printed plus an edge threshold, or
        a tone of another adjacent pixel on another side of the pixel associated with the pattern to be printed is greater than the value determined by the tone of the pixel associated with the pattern to be printed plus the edge threshold; and
    in response to a determination that the tone of the adjacent pixel on the one side of the pixel associated with the pattern to be printed is greater than the value determined by the tone of the pixel associated with the pattern to be printed plus the edge threshold, or
    in response to a determination that the tone of the other adjacent pixel on the other side of the pixel associated with the pattern to be printed is greater than the value determined by the tone of the pixel associated with the pattern to be printed plus the edge threshold,
    increase the firing threshold to decrease the likelihood of printing of the pattern.

5. The apparatus according to claim 4, wherein the adjacent pixel on the one side of the pixel associated with the pattern to be printed represents a pixel to a left side or above the pixel associated with the pattern to be printed, and the other adjacent pixel on the other side of the pixel associated with the pattern to be printed respectively represents a pixel to a right side or below the pixel associated with the pattern to be printed.

6. The apparatus according to claim 1, wherein the machine readable instructions to determine whether the pixel associated with the pattern to be printed includes the darker tone compared to the adjacent pixel when executed by the processor further cause the processor to:
    determine whether
        the tone of the adjacent pixel on one side of the pixel associated with the pattern to be printed is less than a value determined by the tone of the pixel associated with the pattern to be printed minus an edge threshold, or
        a tone of another adjacent pixel on another side of the pixel associated with the pattern to be printed is less than the value determined by the tone of the pixel associated with the pattern to be printed minus the edge threshold; and
    in response to a determination that the tone of the adjacent pixel on the one side of the pixel associated with the pattern to be printed is less than the value determined by the tone of the pixel associated with the pattern to be printed minus the edge threshold, or
    in response to a determination that the tone of the other adjacent pixel on the other side of the pixel associated with the pattern to be printed is less than the value determined by the tone of the pixel associated with the pattern to be printed minus the edge threshold,
    decrease the firing threshold to increase the likelihood of printing of the pattern.

7. The apparatus according to claim 6, wherein the adjacent pixel on the one side of the pixel associated with the pattern to be printed represents a pixel to a left side or above the pixel associated with the pattern to be printed, and the other adjacent pixel on the other side of the pixel associated with the pattern to be printed respectively represents a pixel to a right side or below the pixel associated with the pattern to be printed.

8. The apparatus according to claim 1, wherein the machine readable instructions to determine whether the pixel associated with the pattern to be printed includes the lighter tone, the darker tone, or the similar tone compared to the adjacent pixel when executed by the processor further cause the processor to:

analyze a row of an image including a plurality of pixels including the pixel associated with the pattern to be printed by determining whether the tone of the adjacent pixel on one side of the pixel associated with the pattern to be printed is greater than a value determined by the tone of the pixel associated with the pattern to be printed plus an edge threshold, a tone of another adjacent pixel on another side of the pixel associated with the pattern to be printed is greater than the value determined by the tone of the pixel associated with the pattern to be printed plus the edge threshold, the tone of the adjacent pixel on the one side of the pixel associated with the pattern to be printed is less than a value determined by the tone of the pixel associated with the pattern to be printed minus the edge threshold, or the tone of the other adjacent pixel on the other side of the pixel associated with the pattern to be printed is less than the value determined by the tone of the pixel associated with the pattern to be printed minus the edge threshold;

in response to a determination that the tone of the adjacent pixel on the one side of the pixel associated with the pattern to be printed is greater than the value determined by the tone of the pixel associated with the pattern to be printed plus the edge threshold, or in response to a determination that the tone of the other adjacent pixel on the other side of the pixel associated with the pattern to be printed is greater than the value determined by the tone of the pixel associated with the pattern to be printed plus the edge threshold, increase the firing threshold to decrease the likelihood of printing of the pattern;

in response to a determination that the tone of the adjacent pixel on the one side of the pixel associated with the pattern to be printed is less than the value determined by the tone of the pixel associated with the pattern to be printed minus the edge threshold, or in response to a determination that the tone of the other adjacent pixel on the other side of the pixel associated with the pattern to be printed is less than the value determined by the tone of the pixel associated with the pattern to be printed minus the edge threshold, decrease the firing threshold to increase the likelihood of printing of the pattern; and analyze further rows of the image by reversing, for each further row, an order of the adjacent pixel on the one side of the pixel associated with the pattern to be printed and the other adjacent pixel on the other side of the pixel associated with the pattern to be printed.

9. A method for dynamic threshold based error diffusion comprising:

determining, by a processor, whether a pixel associated with a pattern to be printed includes a lighter tone, a darker tone, or a similar tone compared to an adjacent pixel, wherein the similar tone represents a tone of the pixel associated with the pattern to be printed that is within a specified range of a tone of the adjacent pixel;

in response to a determination that the pixel associated with the pattern to be printed includes the similar tone compared to the adjacent pixel, utilizing a firing threshold to determine whether to print the pattern by determining whether the tone of the pixel associated with the pattern to be printed is greater than the firing threshold, and in response to a determination that the tone of the pixel associated with the pattern to be printed is greater than the firing threshold, generating instructions to print the pattern; and in response to a determination that the pixel associated with the pattern to be printed includes the lighter tone or the darker tone compared to the adjacent pixel, respectively increasing or decreasing the firing threshold to respectively decrease or increase a likelihood of printing of the pattern.

10. The method according to claim 9, wherein determining whether the pixel associated with the pattern to be printed includes the lighter tone compared to the adjacent pixel further comprises:

determining whether the tone of the adjacent pixel on one side of the pixel associated with the pattern to be printed is greater than a value determined by the tone of the pixel associated with the pattern to be printed plus an edge threshold, or a tone of another adjacent pixel on another side of the pixel associated with the pattern to be printed is greater than the value determined by the tone of the pixel associated with the pattern to be printed plus the edge threshold, wherein the edge threshold is adjusted based on the tone of the pixel associated with the pattern to be printed; and in response to a determination that the tone of the adjacent pixel on the one side of the pixel associated with the pattern to be printed is greater than the value determined by the tone of the pixel associated with the pattern to be printed plus the edge threshold, or in response to a determination that the tone of the other adjacent pixel on the other side of the pixel associated with the pattern to be printed is greater than the value determined by the tone of the pixel associated with the pattern to be printed plus the edge threshold, increasing the firing threshold to decrease the likelihood of printing of the pattern.

11. The method according to claim 9, wherein determining whether the pixel associated with the pattern to be printed includes the darker tone compared to the adjacent pixel further comprises:

determining whether the tone of the adjacent pixel on one side of the pixel associated with the pattern to be printed is less than a value determined by the tone of the pixel associated with the pattern to be printed minus an edge threshold, or a tone of another adjacent pixel on another side of the pixel associated with the pattern to be printed is less than the value determined by the tone of the pixel associated with the pattern to be printed minus the edge threshold; and in response to a determination that the tone of the adjacent pixel on the one side of the pixel associated with the pattern to be printed is less than the value determined by the tone of the pixel associated with the pattern to be printed minus the edge threshold, or in response to a determination that the tone of the other adjacent pixel on the other side of the pixel associated with the pattern to be printed is less than the value determined by the tone of the pixel associated with the pattern to be printed minus the edge threshold, decreasing the firing threshold to increase the likelihood of printing of the pattern.

12. A non-transitory computer readable medium having stored thereon machine readable instructions to provide dynamic threshold based error diffusion, the machine readable instructions, when executed, cause a processor to:

determine whether a pixel associated with a pattern to be printed includes a lighter tone or a darker tone compared to an adjacent pixel or a set of adjacent pixels; and in response to a determination that the pixel associated with the pattern to be printed includes the lighter tone or the darker tone compared to the adjacent pixel or the set of adjacent pixels, respectively increase or decrease a firing threshold to respectively decrease or increase a likelihood of printing of the pattern.

13. The non-transitory computer readable medium according to claim 12, wherein the machine readable instructions to increase or decrease the firing threshold to respectively decrease or increase the likelihood of printing of the pattern, when executed, further cause the processor to:

increase or decrease the firing threshold by a percentage that corresponds to a difference between a tone of the pixel associated with the pattern to be printed and a tone of the adjacent pixel or the set of adjacent pixels, or a difference between the tone of the pixel associated with the pattern to be printed and a tone of another adjacent pixel or another set of adjacent pixels to respectively decrease or increase the likelihood of printing of the pattern.

14. The non-transitory computer readable medium according to claim 12, wherein the machine readable instructions to increase or decrease the firing threshold to respectively decrease or increase the likelihood of printing of the pattern, when executed, further cause the processor to:

increase or decrease the firing threshold by a percentage that corresponds to a tone of the pixel associated with the pattern to be printed to respectively decrease or increase the likelihood of printing of the pattern.

15. The non-transitory computer readable medium according to claim 12, wherein the machine readable instructions, when executed, further cause the processor to:

determine, for the pixel associated with the pattern to be printed, whether the firing threshold is increased or whether the firing threshold is decreased;

in response to a determination, for the pixel associated with the pattern to be printed, that the firing threshold is increased or that the firing threshold is decreased, determine, for a next pixel associated with the pattern to be printed, a change in the firing threshold based on a determination of whether the firing threshold is decreased or whether the firing threshold is increased;

determine a run limit associated with the firing threshold; and in response to a determination of the change in the firing threshold, maintain the firing threshold for the run limit for a number of pixels corresponding to the run limit.

\* \* \* \* \*